J. Dame.
Parral & Bow.
N° 11,721. Patented Sep. 26, 1854.
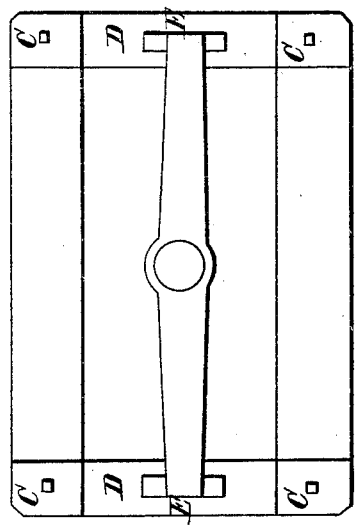
Fig. 2. Front view
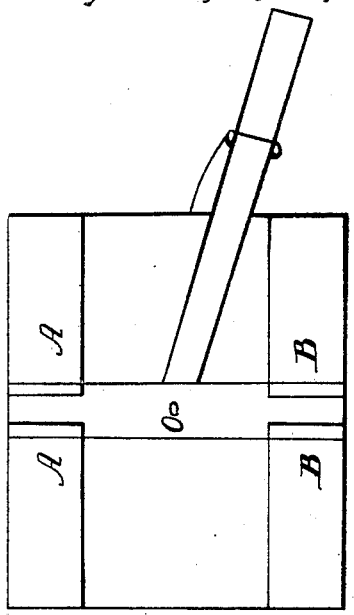
Fig. 1. Side view
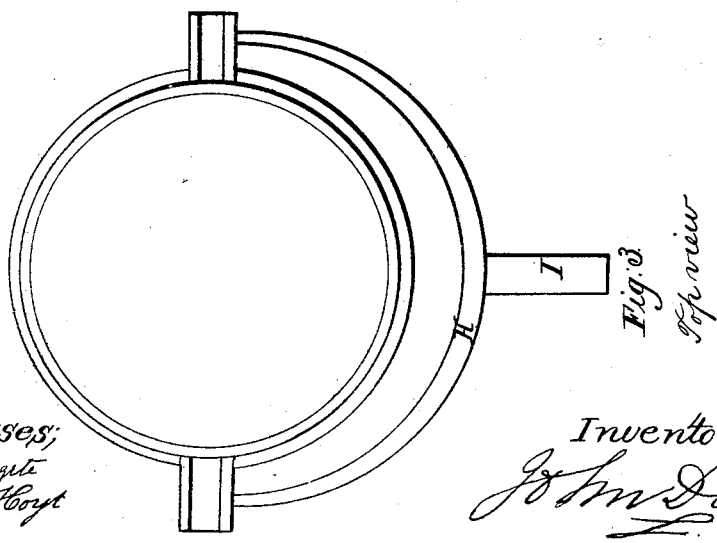
Fig. 3. Top view
Witnesses;
Bartlett Claggett
Alfred M. Hoyt
Inventor;
John Dame

UNITED STATES PATENT OFFICE.

JOHN DAME, OF PORTSMOUTH, NEW HAMPSHIRE.

PARREL AND BOW.

Specification of Letters Patent No. 11,721, dated September 26, 1854.

*To all whom it may concern:*

Be it known that I, JOHN DAME, of Portsmouth, in the county of Rockingham and State of New Hampshire, have invented a new and useful Parrel with Bow Attached, to which the Top Yards of Vessels May be Secured; and I do hereby declare that the following is a full, clear, and exact description of the construction of the same, reference being had to the annexed drawing, making a part of this specification, in which—

Figure 1, represents a side view, Fig. 2, a front view, and Fig. 3 a top view of my parrel and parrel-bow.

The nature of my invention consists in providing two upper semi-bands Fig. 1, A, A, and two lower semi-bands B, B, of iron, copper, composition, or other metal of sufficient width so fastened by bolts, C, Fig. 2, to side pieces or supporters, D, D, of like material as to form a complete upper and a lower circle, of size sufficiently large to easily play around the mast, when the same are lined inside with wood, leather, or composition. Midway in each side piece or supporter I make a mortise, E, sufficiently large to allow the admission of the ends and the proper working of my parrel-bow, Fig. 3, H, up and down, or to and from either front semi-band. Each end of my parrel-bow— which I make of like material as before mentioned—I secure in its proper mortise, E, Fig. 2, by a bolt, O, Fig. 1, passing through the side piece and the end aforesaid. The object of said parrel-bow thus secured and the working of the same is to prevent the jamming of the parrel on the mast in hoisting or in lowering the yard, and also to divide any strain of the yard between the toggle, I, Fig. 3, and the ends of the parrel-bow.

I make no claim for the lining of my parrel with wood, leather or composition inside, but

What I claim as my invention and desire to secure by Letters Patent is—

The construction, arrangement and combination of the said upper and lower semi-bands with the side-pieces or supporters, together with the parrel-bow, to which the yard is secured, substantially as herein set forth.

JOHN DAME.

Witnesses:
J. BARTLETT CLAGGETT,
ALFRED M. HOYT.